(No Model.)
P. S. & A. J. DOWNIE.
FISHING APPARATUS.
No. 522,111.   Patented June 26, 1894.
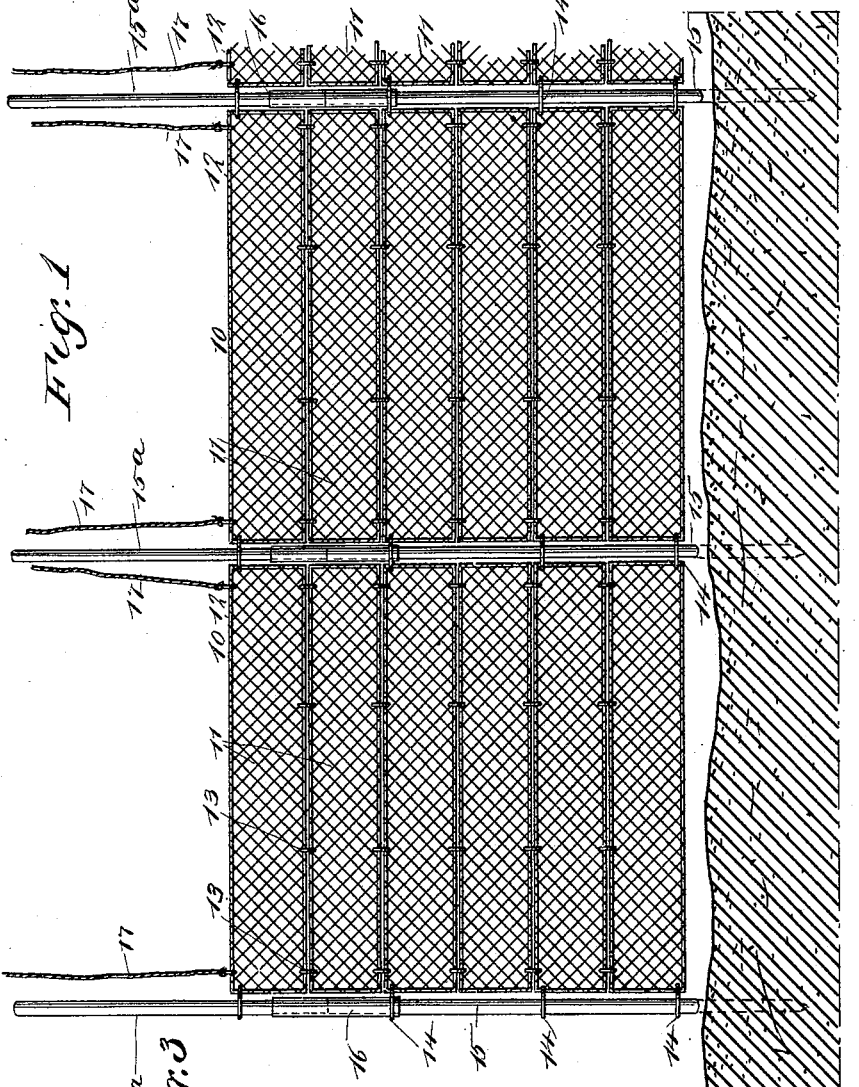
WITNESSES:
J. A. Bergstrom
C. Sedgwick
INVENTORS:
P. S. Downie
A. J. Downie
BY Munn & Co
ATTORNEYS.

UNITED STATES PATENT OFFICE.

PETER S. DOWNIE AND ALFRED J. DOWNIE, OF MARINETTE, WISCONSIN.

FISHING APPARATUS.

SPECIFICATION forming part of Letters Patent No. 522,111, dated June 26, 1894.

Application filed October 12, 1893. Serial No. 487,925. (No model.)

*To all whom it may concern:*

Be it known that we, PETER S. DOWNIE and ALFRED J. DOWNIE, of Marinette, in the county of Marinette and State of Wisconsin, have invented a new and Improved Fishing Apparatus, of which the following is a full, clear, and exact description.

Our invention relates to improvements in fishing apparatus, and especially to that class of apparatus which is used in what is known as pound fishing, and in which lead nets supported on poles are used to lead the fish into a trap. These poles project above the water and generally they are driven firmly into the bottom of the river, lake, or other body of water in which the nets are placed. The objections to this system are that in cold countries the water freezes in winter around the poles, and either carries them away or breaks them, the floating grass and other débris catches in the nets, and the nets being constructed of twine are likely to be badly damaged and are not very durable.

The object of our invention is to overcome the above named objections which we do by producing wire nets which are extremely strong, arranging the nets in such a manner that they may fold one upon another and so be dropped to the bottom to escape drifting, winds, &c., when necessary; and connecting the sections of the nets with each other and with the supporting stakes in such a manner that they are freely suspended. At the close of the fishing season, or before winter sets in, the stakes are cut off beneath the ice line and are spliced when the spring opens.

To these ends our invention consists of certain features of construction and combinations of parts, as will be hereinafter described and claimed.

Reference is to be had to the accompanying drawings, forming a part of this specification, in which similar figures of reference indicate corresponding parts in all the views.

Figure 1 is a broken front view of our improved net, and shows the manner of connecting the net sections and of supporting and guiding them. Fig. 2 is a rear view of the net and of one of the supporting stakes. Fig. 3 is a detail sectional view, showing the means of splicing the stakes after they have been sawed off.

The net 10 shown in Figs. 1 and 2, is composed of a series of sections 11, each provided with a binding frame 12 and made up of wire netting which is preferably steel wire. The sections are arranged in banks between their supporting stakes and the several sections or net frames are connected together by rings 13 which are preferably of steel and which form a free connection, permitting the net sections to be dropped down and to fold one upon the other, as shown in Fig. 2. The ends of the net sections are provided with stronger rings 14 which run on the stakes 15, these being driven into the bottom and projecting upward above the water surface in the usual manner.

When the winter season approaches the stakes 15 are cut off below the ice line, and after the winter is over the top sections $15^a$, which have been cut off underneath, may be again spliced on or secured to the body portions of the stakes, this being effected by means of the sleeve coupling 16 which is secured to the lower end of each section $15^a$ and is adapted to slip on over the top of the bottom portion 15 of the stake, but if desired the sleeve may be made fast to the body 15 and the extension $15^a$ slipped into it.

The nets are supported on the stakes 15 and are held in a vertical position by cords 17 which are secured to the nets and extend upward to the stake tops in the usual way. The hoisting cords may be used for raising the nets in the usual way and they also enable the nets to be dropped when necessary, as in case of a storm, so that the drifting grass and other material may pass over the nets which, on being dropped, fold with the several sections one upon another, as shown clearly in Fig. 2.

Having thus described our invention, we claim as new and desire to secure by Letters Patent—

In a net fishing apparatus, the combination with a series of vertical stakes arranged in suitable proximity and relation, of a net composed of a series of sections whose adjacent edges are loosely connected by rings, each section having a ring attached at each end, and the rings being arranged contiguous to the upper and lower edges of adjoining sections, and engaging and adapted to slide on the stakes, and hoisting cords attached to the upper section of a series, as shown and described, whereby the net is adapted to be extended vertically and the several sections to fold flatwise upon each other, as specified.

PETER S. DOWNIE.
ALFRED J. DOWNIE.

Witnesses:
L. K. MACNEILL,
W. P. GREENE.